E. B. KILLEN.
LANDING CARRIAGE OR FRAME FOR AIRCRAFT.
APPLICATION FILED JUNE 3, 1917.
1,379,576. Patented May 24, 1921.
Fig. 1.
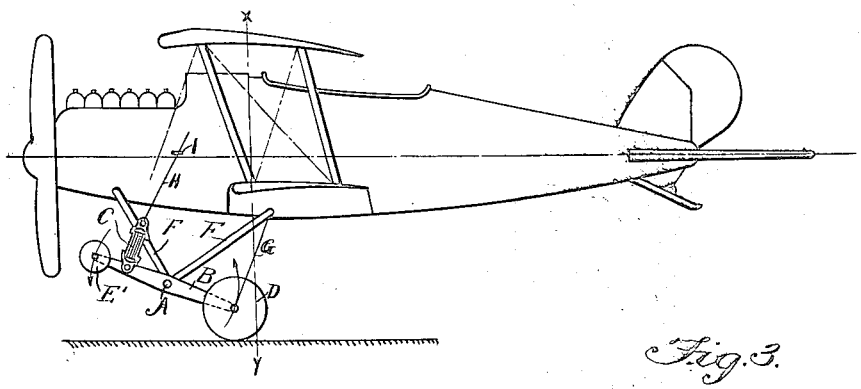
Fig. 3.
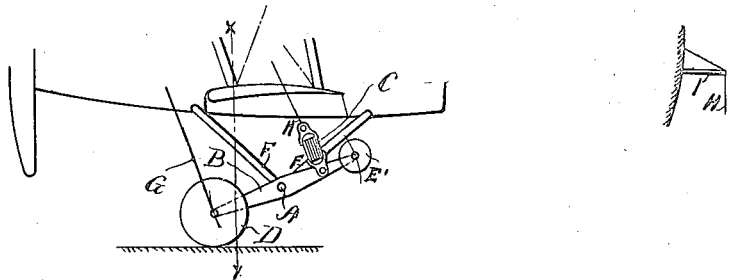
Fig. 2.
Inventor
Edward Brice Killen
By B. Singer,
Attorney

UNITED STATES PATENT OFFICE.

EDWARD BRICE KILLEN, OF LONDON, ENGLAND.

LANDING CARRIAGE OR FRAME FOR AIRCRAFT.

1,379,576.  Specification of Letters Patent.  Patented May 24, 1921.

Application filed June 3, 1919. Serial No. 301,403.

*To all whom it may concern:*

Be it known that I, EDWARD BRICE KILLEN, of 27 Queen Victoria street, London, E. C. 4, England, engineer, have invented certain new and useful Improvements in or Relating to Landing Carriages or Frames for Aircraft, of which the following is a specification.

My invention relates to improved landing frames or carriages for aircraft, which allow the wheels to give much more when coming into ground contact, than existing landing frames or carriages which are weak and are liable to break or collapse under certain conditions when the aircraft is landing, all as hereinafter more particularly described, illustrated by drawings, and pointed out in the claim.

In order that my invention may be properly understood and readily carried into effect, I have hereunto appended one explanatory sheet of drawings, of which—

Figure 1 is a side elevation of an aeroplane fitted with one form of my rocking device and showing the main landing wheels trailed at an extraordinarily favorable angle of impact, and arranged behind the pivoted center of the shock absorbing frame and mounted on right and left pivoted lever arm devices, and showing the upper arm of each lever device carrying a small buffer wheel. Fig. 2 is a partial side elevation of the same aeroplane showing the pivoted center arranged behind the main landing wheels and the upper arm of each lever device without having the extraordinarily favorable angle of wheel impact but with a great possible rise of wheel and the upper arm of each lever device carrying a small buffer wheel.

Fig. 3 is a partial cross section of the machine showing how the wire from the spring may be kept in alinement with the frame below by a stream line outrigger from the body of the aircraft.

My construction with reference to the drawings is as follows:—

The object of this invention is to overcome existing defects in landing frames and to substitute in their place what I will call a balance like shock absorbing landing frame, which does the work of existing landing frames more efficiently, without running the same risk of being smashed up when landing. Existing landing frames have very little flexibility or give when the running wheels strike the ground, but my landing frame is constructed capable of absorbing abnormal landing shocks without breaking, by allowing an abnormal rise or vertical movement to take place on the main running wheels when the aircraft comes to earth or is compelled to land on rough or unsuitable ground.

I may construct my shock absorbing landing frame with what I call right and left pivoted lever arm devices of any required shape and construction, which lever arm device may be suitably attached together laterally in any well known manner, and form a balance like frame, which may have lower and upper lever ends, and instead of attaching the running wheels with tires, as at present, to practically a rigid frame and depending upon shock absorbers with a very limited range of action, to absorb the landing shocks, I attach the wheels with tires mounted, to the lower end of my rocking balance like frame so that the main wheels with tires attached have a great vertical rise as and when required to absorb abnormal landing shocks without my landing frame breaking under severe work. In fact my landing balance like frame becomes in itself an automatic shock absorber, absorbing the unavoidable shocks more efficiently than existing landing frames when the running wheels strike the earth.

On the lower end of each lever arm in one form of my invention is securely attached one or more wheels and when said wheels strike the ground, the possible amount of give or vertical rise of the wheels is abnormal and according to the shock received. The abnormal amount of give in the main wheels attached to the lower lever end of the balance like frame is arranged and regulated by the effective length of the lower arms and the controlling springs (or their equivalents) which I prefer to be so attached as to require less movement or range of action than the lever ends carrying the main landing wheels. The pivoted lever arm devices are mounted on suitable axles or on spindles mechanically rigidly attached to the right frame of the aircraft proper, thereby forming a mechanical, but resilient, connection between the lower main wheels and the aircraft proper. The upper lever end of my balance like frame may have wheels or runners, attached to it, but said upper end is constructed and arranged to only come into ground contact under abnormal shocks, under which shocks the lower end rises abnormally in a vertical direction as and when required, and without detriment to the relative position of the center of gravity of the aircraft.

With this invention I may arrange for an abnormal amount of give or shock absorbing qualities to be obtained between the air-craft proper and its main running wheels, to suit all types and sizes of aircraft by efficiently controlling the amount of vertical rise in the lower end of the balance like lever arm device, by means of suitable springs, supports, shock absorbers, or their equivalents. The shock absorbing frame is suitably attached, controlled and pivoted beneath the air craft proper in any well known manner on one or more suitable axles or on spindles which enable the lower and upper ends of the lever arm device to efficiently move up and down in opposite directions as and when required, and I prefer when possible that the lower main wheels are arranged beneath the aircraft so that both vertical and longitudinal shocks are absorbed when landing, instead of only vertical shocks, although on certain types of air-craft the lever arm device may be set or inclined in the opposite direction. With such a fitment, the lower main wheels would be in front and the upper buffer wheels behind, but under such conditions longitudinal shocks would not be so well absorbed when the aircraft is landing, as would occur when the wheels trail behind the pivoting. The upper running buffer wheels only come into contact with the earth under abnormal shocks when the aircraft is landing, and do not run on the ground after the impact of landing is exhausted, but only momentarily touch the earth when the lower main wheels rise abnormally under severe shocks. In other words, the lower main landing wheels first strike the earth, and automatically bring the auxiliary upper buffer wheels into contact with the earth, forming temporarily say a type of bogie carriage with four or more wheels, beneath the aircraft, which are brought into ground contact as and when required, which bogie carriage is used as such only momentarily when the aircraft lands at any high speeds or with great violence, but without affecting the balance of the aircraft in an adverse direction when landing, or interfering with the aircraft taxi-ing solely on its main lower wheels, before leaving the earth.

There is no mechanical difficulty in sensitively suspending and mounting beneath the aircraft proper the main running wheels to give the necessary abnormal vertical rise wanted in said wheels to save the aircraft from injury when landing, without the controlling springs and supports, or equivalents, getting out of working order, and a small deflection on the suitable controlling springs, or their equivalent, enables a great vertical rise to be obtained in the wheels attached to the lower end of my balanced frame. I may support and control my balance like shock absorbing frame as a trailer or in the opposite direction according to the type of air-craft using my device, in any suitable position and required angle to the aircraft proper, by means of springs, rubber shock absorbers, or their equivalent, in any well known of efficient manner which allows the lower end of the frame with wheels attached, to move upward, and the upper end to move downward as and when required, provided the center of gravity of the aircraft when the wheels strike the ground, is as may best suit the requirements of the machine, such for instance as behind the line of support of the body, or other correct relative and proper working position to the aircraft proper as both flying and landing conditions may suggest.

This invention overcomes many of the troubles which exist at present when a pilot is landing, and allows smaller and stronger but equally resilient tires to take the place of existing types of tires, thereby giving to aircraft an improved and safe type of landing or running feet, which absorb the landing shocks better than at present, enabling pilots to land with greater safety to themselves and their machines, and also to get more easily from the earth by having the ground shocks better absorbed when taxi-ing under practically all working conditions. This improved landing device is especially suitable for fighting air craft where landing must sometimes take place under the worst conditions.

I may construct my shock absorbing balance like frame in all suitable shapes and dimensions from suitable materials to suit the many varying types of aircraft and fit same in correct position in any well known or suitable manner to the aircraft proper, provided the center of gravity of the aircraft is such that when the main lower wheels strike the earth, the tendency of the machine is to be dumped backward on its tail skid or equivalent, and not forward.

If thought advantageous, my balance like frame may be constructed and arranged with a wing-like plane which aids in the lifting power of the machine when in flight, and under certain conditions this shock absorbing balance like frame may be constructed to form a float with running feet, suitable for waterplanes.

This invention enables the main running wheels and axles of aircraft to be mechanically attached to the aircraft, even when absorbing abnormal shocks, without breaking the mechanical connections between the running wheels and the aircraft proper, even if the rubber shock absorbers or springs, or equivalent, which control the balance like arms, collapse, and it is also to be noted that the vertical range of movement of the main running wheels, which is abnormal, is not restricted only to the same total movement as the shock absorbing springs or their equivalent, which latter may have a small range of movement or action, and yet the running wheels have a great vertical rise. The pivoted lever arm devices may be constructed in crank or other suitable formations provided their construction allows them to be suitably attached to the aircraft, having when attached proper lateral stability. The attachment of the pivoted lever arm devices is preferably arranged so that they are easily attached to and detached from their axles or pivots like say a wheel by means of a hub part or equivalent.

On account of the many varying types of aircraft it is impossible to illustrate or give details of the various mechanical frame connections and fitments between the aircraft proper and the pivoted lever arm devices which are efficiently fitted below or beneath the aircraft, because these mechanical connections and fitments vary according to the type of aircraft using my shock absorbing landing frame, but they can be arranged in any well known manner to give the required strength, range or movement, and stability to my landing frame under all working conditions without interfering with the correct balance of the aircraft when landing. The drawings, however, are sufficient to illustrate the action of my shock absorbing landing frame and some details of the fitments beneath the aircraft.

Referring to the figures in which similar letters refer to similar parts, it will be seen in Fig. 1 that a pivoted center A is attached by the struts F to the fixed frame of the aircraft below the body of the machine upon which is mounted, free to oscillate, on any form of hub or equivalent giving lateral stability, a pivoted lever device B acted upon by a spring C and limited in a downward direction by a flexible cable G. The wheel D is in contact with the ground and (in conjunction with a duplicate on the other side) is carrying the weight of the machine resiliently by reason of the spring C. The dotted line X—Y shows the position of the center of gravity of the machine. When landing, the downward force upon the right and left pivoted lever arm devices B will cause extension of the controlling springs, and if severe enough it will ultimately cause contact of the small buffer wheel marked $E^1$ with the ground so that for the moment all means of support may be in ground contact but the power of the springs C will, when the abnormal shock has been absorbed, cause a return to the taxi-ing position as shown in the drawing. By reason of the position of the wheel D in front of the center of gravity the machine in landing will exert a tendency to depress the tail, the ultimate downward force of which will be borne by the tail skid.

In Fig. 2 is shown a side elevation with my landing frame set or inclined in the reverse way to the above and thus having the main landing wheels in front but in other respects equivalent to the form referred to in Fig. 1. In this case, however, horizontal shock is not overcome so efficiently as with the trailing wheels in the position shown in Fig. 1. It does, however tend to increase the distance between center of gravity and point of wheel contact as pressure increases and therefore causes the tail to come to earth more quickly which may be required under certain landing conditions. In this figure the upper arm terminates as a buffer wheel $E^1$ so that ground contact therewith acts as a kind of brake and tends to arrest the progress of the machine. In the taxi-ing position this buffer wheel $E^1$ is not in ground contact.

In Fig. 3 is shown a partial cross section of the machine in which the wire tie (marked H in all the figures) is provided with a spreader I which being of stream line section offers little resistance to the wind but keeps the wire vertically over the frame when the body of the machine is narrow.

Although for clearness of description my invention is shown as fitted to a small biplane, it is obvious that, with suitable structural modifications, it can be applied to any other type of machine and the character of spring illustrated may be replaced by any other form or material which provides the requisite resiliency, furthermore several wheels may be mounted in any well known manner on one axle according to the weight of the machine.

Claim:

An airship, a landing frame arranged below the body of the airship, said landing frame being pivotally mounted at a point intermediate its ends for vertical angular movement, a shock absorbing spring arranged to normally raise one end of the landing frame, a buffer wheel mounted at the elevated end of the landing frame, a landing wheel mounted at the lower end of the landing frame, a tie wire secured to the airship body and to the upper end of the spring, and a flexible cable to limit the pivotal movement of the landing frame, said cable being connected to the body of the airship and also to the lower end of the landing frame.

In testimony whereof I affix my signature in presence of two witnesses.

EDWARD BRICE KILLEN.

Witnesses:
 JOHN LIDDLE,
 JOHN TRAIN LIDDLE.